United States Patent [19]

Fuwa et al.

[11] Patent Number: 5,915,362
[45] Date of Patent: Jun. 29, 1999

[54] INTAKE CONTROL APPARATUS AND METHOD FOR ENGINE

[75] Inventors: Naohide Fuwa; Hiroshi Tanaka, both of Susono, Japan

[73] Assignee: Toyota Jidosha Kabushiki Kaisha, Toyota, Japan

[21] Appl. No.: 08/871,640

[22] Filed: Jun. 9, 1997

[30] Foreign Application Priority Data

Jun. 10, 1996 [JP] Japan .................................. 8-147123

[51] Int. Cl.⁶ .................................................. F02M 51/00
[52] U.S. Cl. ..................................... 123/491; 123/179.18
[58] Field of Search ............................... 123/491, 179.18

[56] References Cited

U.S. PATENT DOCUMENTS

| | | |
|---|---|---|
| 4,987,871 | 1/1991 | Nishikawa . |
| 5,211,150 | 5/1993 | Anzai . |
| 5,215,062 | 6/1993 | Asano et al. . |
| 5,331,936 | 7/1994 | Messih et al. . |
| 5,542,388 | 8/1996 | Ichinose et al. . |
| 5,588,498 | 12/1996 | Kitada ............................. 123/179.18 |
| 5,590,633 | 1/1997 | Tomisawa ............................... 123/491 |
| 5,596,957 | 1/1997 | Ichinose et al. .................... 123/179.18 |
| 5,722,365 | 3/1998 | Sadakane et al. ...................... 123/491 |

FOREIGN PATENT DOCUMENTS

| | | |
|---|---|---|
| 63-235632 | 9/1988 | Japan . |
| 1-119874 | 8/1989 | Japan . |

*Primary Examiner*—Thomas N. Moulis
*Attorney, Agent, or Firm*—Oblon, Spivak, McClelland, Maier & Neustadt, P.C.

[57] ABSTRACT

A apparatus and method for adjusting the amount of air introduced into a cylinder of an internal combustion engine. An intake passage is connected to the cylinder for introducing air. An intake valve is provided in the intake passage for cyclically opening and closing the cylinder. An injector is provided in the intake passage for injecting fuel. A throttle valve is positioned in the intake passage for adjusting an amount of air flow into the cylinder. An electronic control unit (ECU) controls the position of the throttle valve. The ECU closes the intake passage to decrease the pressure in the intake passage when cranking is started. The ECU moves the throttle valve to a first open position $\theta 2$ to increase the amount of air introduced into the cylinder after a predetermined time period elapses from the start of engine cranking. The ECU moves the throttle valve to an open position $\theta 1$ when the engine starts.

17 Claims, 8 Drawing Sheets

INTAKE CONTROL APPARATUS AND METHOD FOR ENGINE

BACKGROUND OF THE INVENTION

The present invention relates to fuel injection and intake air control apparatuses and methods for adjusting the amount of air introduced into a cylinder of an internal combustion engines, and more particularly, to apparatuses and methods for enhancing the starting ability of engines.

Electronic type fuel supplying apparatuses provided with a plurality of injectors to inject fuel into engines are known in the prior art. In a typical apparatus, the injectors are arranged in an intake passage communicated with each engine cylinder and located in the vicinity of a fuel chamber. The injectors inject fuel to the vicinity of the fuel chamber. The injected fuel amount is controlled in accordance with the running condition of the engine by adjusting the time period during which the injectors are opened. The fuel injected to the vicinity of the fuel chamber is readily drawn into combustion chambers. This improves engine performance, especially the responsiveness of the engine (the response in fuel injection amount) when the engine is in a transitional state. In addition, undesirable engine emissions are reduced.

However, the starting ability of the engine is less than desirable since the atomization of fuel is insufficient when starting the engine. To cope with this problem, the fuel injected from injectors is collided against the bodies of associated intake valves to atomize the fuel. However, it is difficult to atomize the fuel by colliding the fuel against the valve bodies when the surface temperature of the valve bodies is low. Furthermore, the velocity of the air flowing through the intake passage is low when starting the engine. Thus, it is difficult to guide the injected fuel using the air flow. This results in the fuel condensing on the walls of the intake passage and decreases the amount of fuel supplied to the combustion chambers.

Japanese Unexamined Utility Model Publication No. 1-119874 (first prior art example) discloses an apparatus that solves the above problems. The apparatus is provided with a control valve arranged in the intake passage to completely close the intake passage. The control valve is located upstream of the injectors in the intake passage. The control valve closes the intake passage to prevent a large amount of fuel from flowing into the combustion chambers during the period between when the engine is cranked until when the engine is started. The pressure in the intake passage at the downstream side of the control valve is decreased by the reciprocation of pistons so as to produce sufficient negative pressure. This increases the velocity of the air-fuel mixture that is supplied to the combustion chambers. As a result, the amount of fuel that condenses on the wall of the intake chamber decreases and the atomization of the fuel injected from the injectors is enhanced. Accordingly, the starting ability of the engine is improved. Furthermore, the amount of undesirable emissions (e.g., hydrocarbons) is reduced by the decrease in the amount of fuel that is required to start the engine.

Japanese Unexamined Patent Publication No. 63-235632 (second prior art example) discloses an apparatus that compensates for the amount of fuel injected from injectors when starting the engine in accordance with the coolant temperature. More specifically, when the coolant temperature is low, the amount of fuel injected from the injectors is increased. Application of this apparatus to the first prior art example hinders the supply of the optimum amount of fuel to the combustion chambers during starting of the engine. The amount of air-fuel mixture supplied to the combustion chambers and the amount of fuel that condenses on the wall of the intake passage changes in accordance with the level of the negative pressure. Accordingly, the amount of fuel injected from the injectors must be altered in accordance with the level of the negative pressure. Thus, it is difficult to inject the optimum amount of fuel into the combustion chambers during starting of the engine when compensating the fuel amount based on the coolant temperature. As a result, a large amount of hydrocarbons are emitted when starting the engine.

In addition, if the engine does not start within a short time after initiating cranking, it will be more difficult to start since fresh air is not entering the intake passage.

SUMMARY OF THE INVENTION

Accordingly, it is an objective of the present invention to provide an intake control apparatus that improves engine starting.

To achieve the above objective, the present invention provides an apparatus for adjusting the amount of air introduced into a cylinder of an internal combustion engine. The apparatus comprising a crankshaft, a starter for cranking the crankshaft to start the engine. An intake passage is connected to the cylinder for introducing air to the cylinder. An intake valve is provided in the intake passage for selectively opening and closing the cylinder. An injector is provided for injecting fuel to the intake passage. An intake control valve is positioned in the intake passage, the intake control valve serves to selectively allow and restrict the air flow in the intake passage. A first controller controls the position of the intake control valve to adjust the amount of air flow into the cylinder, wherein the first controller controls the intake control valve to decrease the pressure in the intake passage when the engine is cranked, and wherein the first controller moves the intake control valve to a first position to open the intake passage by a predetermined amount to increase the amount of air introduced into the cylinder when a certain time period elapses from when the engine is cranked if the engine has not started running.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENT

An engine fuel injection control apparatus according to the present invention will now be described with reference to FIGS. 1 to 9.

Figure 1:
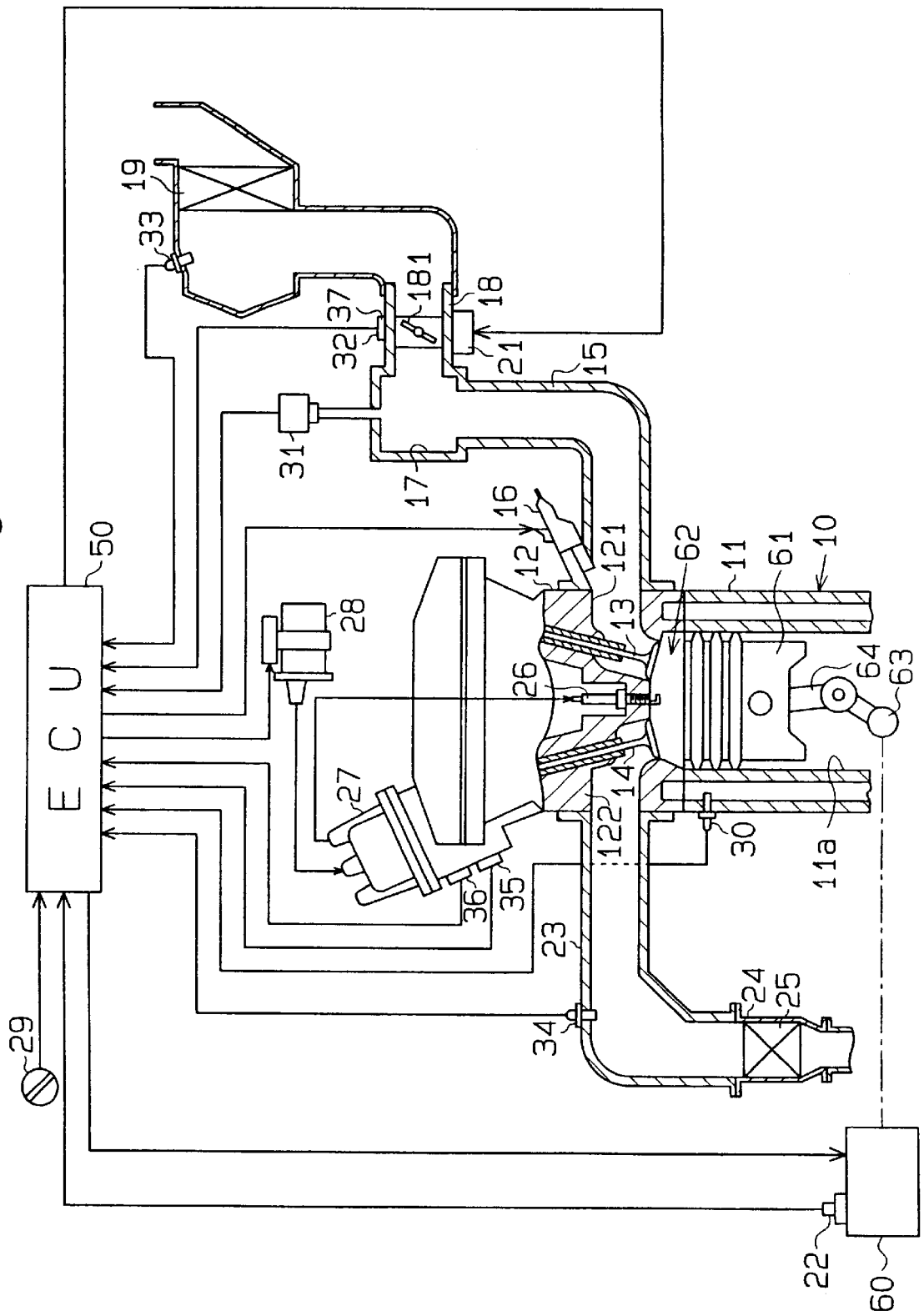
FIG. 1 is a diagrammatic view showing a first embodiment of a fuel injection control apparatus according to the present invention.
Figure 2:
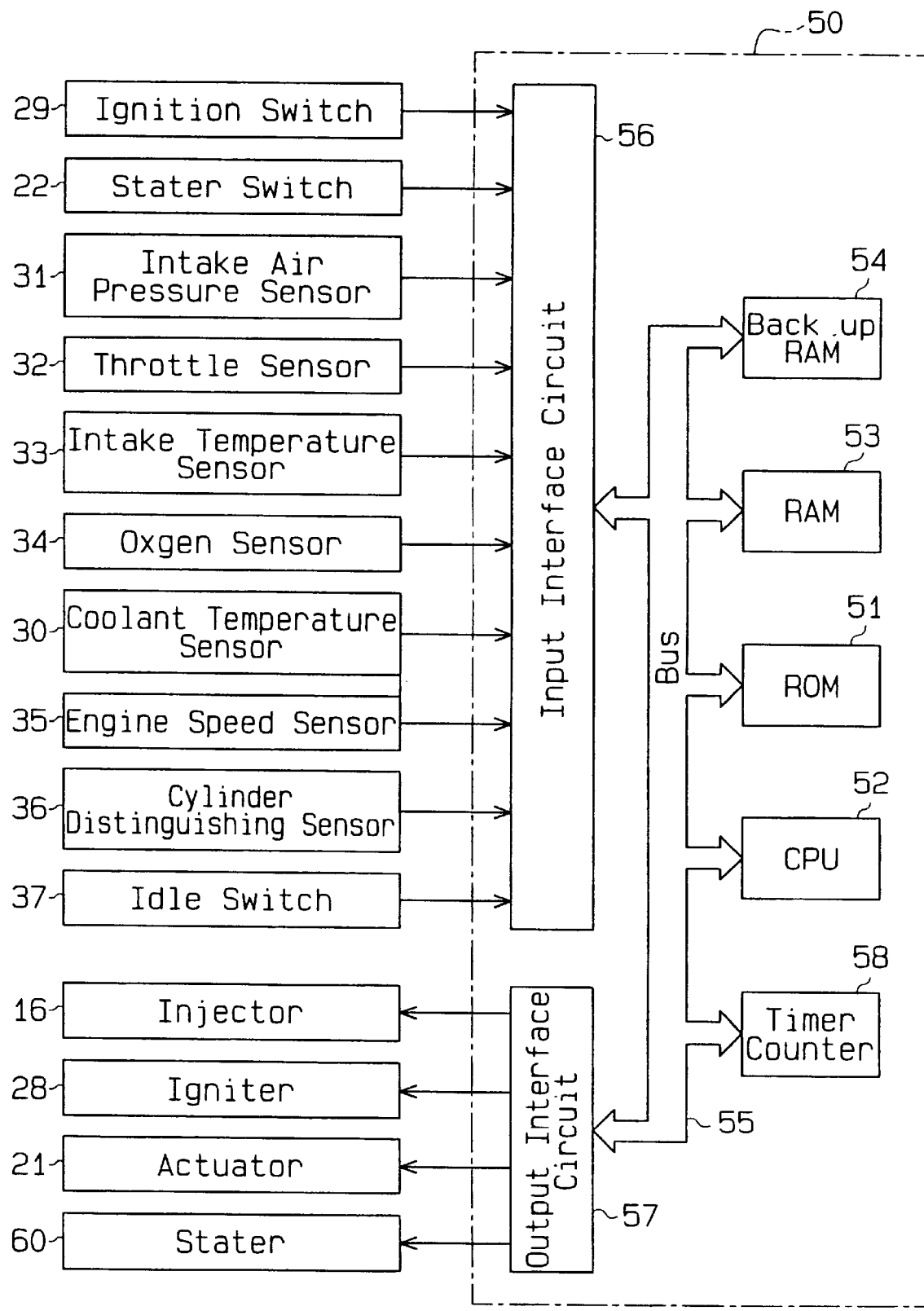
FIG. 2 is a block diagram showing the structure of the electronic control unit.

As shown in FIG. 1, an engine 10 has a cylinder block 11, which is provided with four cylinders 11a (#1, #2, #3, #4). A piston 61 is reciprocally accommodated in each cylinder 11a. Each piston 61 is connected to a crankshaft 63 by means of a connecting rod 64. A cylinder head 12 is arranged above the cylinder block 11 to cover each cylinder 11a. A combustion chamber 62 is defined in each cylinder 11a between the cylinder head 12 and the piston 61. Ignition plugs 26 are provided for the combustion chambers 62 and are arranged along the cylinder head 12.

An intake port 121 and an exhaust port 122 are provided for each cylinder 11a in the cylinder head 12. Each intake port 121 is selectively opened and closed by an intake valve 13, while each exhaust port 12 is selectively opened and closed by an exhaust valve 14. The intake and exhaust valves 13, 14 are arranged in the cylinder head 12. Accordingly, intake and exhaust valves 13, 14 are provided for each cylinder 11a. A coolant temperature sensor 30 is provided in the cylinder block 11 to detect the temperature of the coolant cooling the engine 10, that is, the coolant temperature THW, and to output a signal corresponding to the detected value.

An intake passage 15 is connected to each intake port 121. A surge tank 17, a throttle body 18, and an air cleaner 19 are arranged in the intake passage 15.

The surge tank 17 suppresses pulsations of the intake air. An intake air pressure sensor 31 is provided in the surge tank 17 to detect the intake air pressure PM and to output a signal corresponding to the detected value.

The throttle body 18 includes an electronically controlled throttle valve 181, an actuator 21 for driving the valve 181, and a throttle sensor 32. The actuator 21 includes a step motor. The actuator 21 adjusts the opening angle of the throttle valve 181 to control the amount of air drawn into each cylinder 11a. The throttle sensor 32 detects the opening angle of the throttle valve 181, or the throttle angle TA, and outputs a signal corresponding to the detected signal. An idle switch 37 is incorporated in the throttle sensor 32. The idle switch 37 outputs an idle signal IDL when the throttle valve 181 completely closes the intake passage 15.

An intake air temperature sensor 33 detects the temperature of the air drawn into the intake passage 15, or the intake air temperature, and outputs a signal corresponding to the detected value. The air that passes through the air cleaner 19 flows through the throttle body 18 and the surge tank 17 and is drawn into the combustion chambers 62. An injector 16 is provided for each cylinder 11a in the vicinity of the intake port 121 to inject fuel through the port 121. The amount of fuel injected by each injector 16 is adjusted in accordance with the time period during which the injector 16 is opened. The injected fuel mixes with the air in the associated intake port 121 and forms an air-fuel mixture. When the associated intake valve 13 is opened, the air-fuel mixture is drawn into the combustion chamber 62 for combustion.

An exhaust passage 23 is connected to each exhaust port 122. An exhaust pipe 24 is connected to an end of the exhaust pipe 24. The exhaust gas resulting from the combustion is discharged into the atmosphere by way of the exhaust passage 23. An oxygen sensor 34 detects the oxygen concentration in the exhaust gas and outputs a signal corresponding to the detected value. The exhaust pipe 24 is provided with a three-way catalyst 25. The three-way catalyst 25 removes the three main toxic components included in the exhaust gas, which are hydrocarbon (HC), carbon monoxide (CO), and nitrogen oxide (NOx).

An ignitor 28 is connected to the ignition plugs 26 by means of a distributor 27. The ignitor 28 produces high voltage. The voltage is distributed to each ignition plug 26 in accordance with the rotational angle of the crankshaft 63.

The distributor 27 incorporates a rotor (not shown) that rotates integrally with a camshaft (not shown). An engine speed sensor 35 is provided in the distributor 27 to detect the rotating speed of the crankshaft 63, or the engine speed NE. The speed sensor 35 detects the rotating speed of the crankshaft 63 based on the rotating speed of the rotor and outputs a signal corresponding to the detected value. A cylinder distinguishing sensor 36 is provided in the distributor 27 to detect a reference position on the rotor that corresponds to a certain rotational phase of the crankshaft 63 as the rotor rotates. The distinguishing sensor 36 outputs a cylinder distinguishing signal when detecting the reference position of the rotor.

An electronic control unit (ECU) 50 receives the cylinder distinguishing signals sent from the distinguishing sensor 36. Based on the distinguishing signal, the ECU 50 determines which cylinder 11a is undergoing the intake stroke. The cylinder 11a undergoing the intake stroke is set as the initial starting cylinder. The ECU 50 detects the crank angle with respect to a certain cylinder 11a based on signals sent from the engine speed sensor 35 and the cylinder distinguishing sensor 36. In other words, the ECU 50 detects the type of stroke (intake, compression, combustion, exhaust) that the certain cylinder 11a is undergoing. Accordingly, the ECU 50 is able to determine the ignition timing and the fuel injection timing of the cylinder 11a based on the crank angle. The strokes of each cylinder 11a are carried out in a predetermined order. Therefore, the present stroke carried out in other cylinders may be determined by confirming the present stroke of the certain cylinder 11a.

An ignition switch 29 is provided in the vicinity of a steering column (not shown) to start the engine 10. The ignition switch 29 is turned to an ON position, an OFF position, and a start position.

A starter 60 starts the engine 10. When starting the engine 10, the starter 60 is connected to the crankshaft 63 to apply a rotating force to the crankshaft 63. The starter 63 is driven when the ignition switch 29 is turned to the start position. A starter switch 22 is provided in the starter 63 to detect the actuation of the starter 63 and output a starter signal ST. When the starter 63 is actuated, the value of the starter signal ST is set at one. When the starter 63 is de-actuated, the value of the starter signal ST is set at zero.

Figure 3:
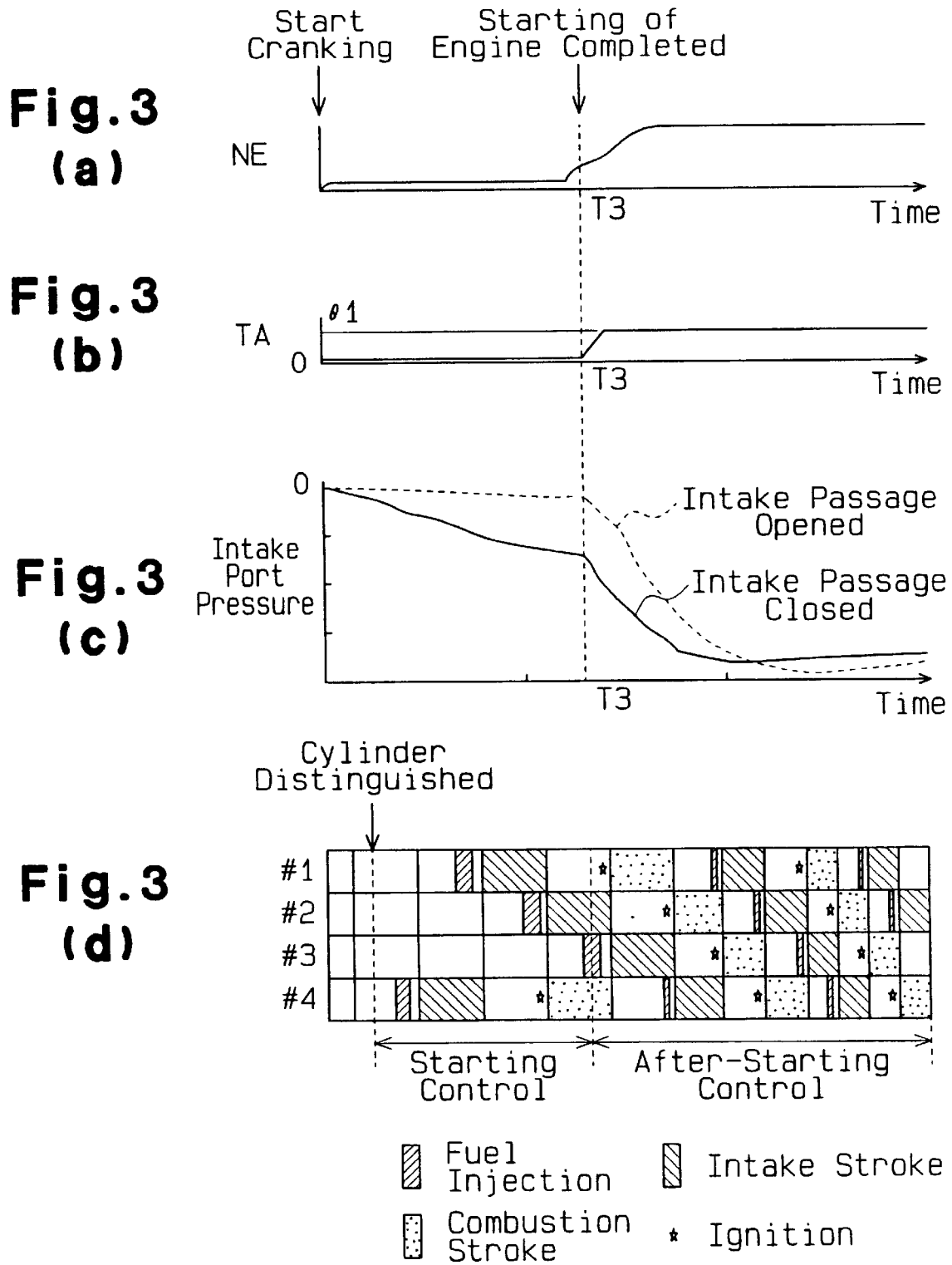
FIG. 3(a) is a time chart illustrating the engine speed when starting the engine.
FIG. 3(b) is a time chart illustrating the opening of the throttle valve when starting the engine.
FIG. 3(c) is a time chart illustrating the negative pressure in the intake passage when starting the engine.
FIG. 3(d) is a time chart illustrating the intake, compression, combustion, and exhaust strokes.
Figure 4:
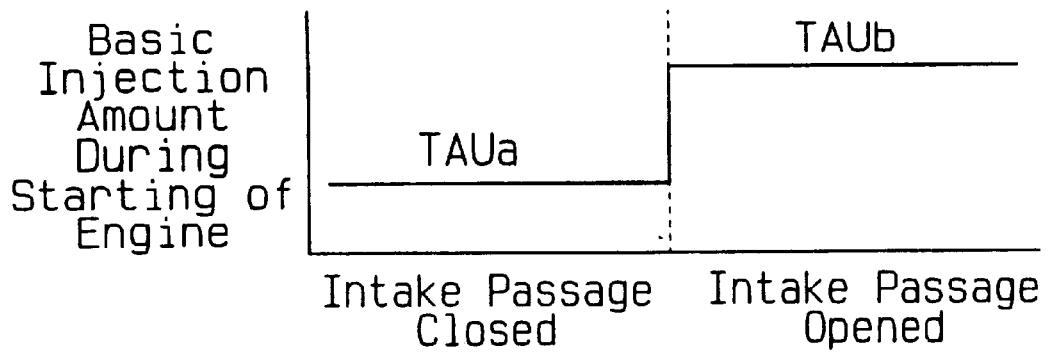
FIG. 4 is a graph illustrating the basic injection amount when starting the engine.

As shown in FIG. 3, the ECU 50 includes a central processing unit (CPU) 52, a read-only memory (ROM) 51, a random access memory (RAM) 53, a backup RAM 54, a timer counter 58, an input interface circuit 56, an output interface circuit 57, and a bus 55. The ROM 51 stores various programs. The RAM 53 temporarily stores various data. The backup RAM 54 temporarily keeps data that have previously been stored. The counter 58 measures time.

The starter switch 22, the ignition switch 29, the coolant temperature sensor 30, the intake air pressure sensor 31, the throttle sensor 32, the throttle sensor 33, the oxygen sensor 34, the engine speed sensor 35, the cylinder distinguishing sensor 36, and the idle switch 37 are connected to the input interface circuit 56. The injectors 16, the ignitor 28, the actuator 21, and the starter 60 are connected to the output interface circuit 57. The CPU 52 executes a control program stored in the ROM 51 to control the injectors 16, the actuator 21, the ignitor 28, and the starter 60 based on the signals sent from the sensors 22, 29–37. When executing the program, throttle valve control and fuel injection control are carried out.

Figure 8:
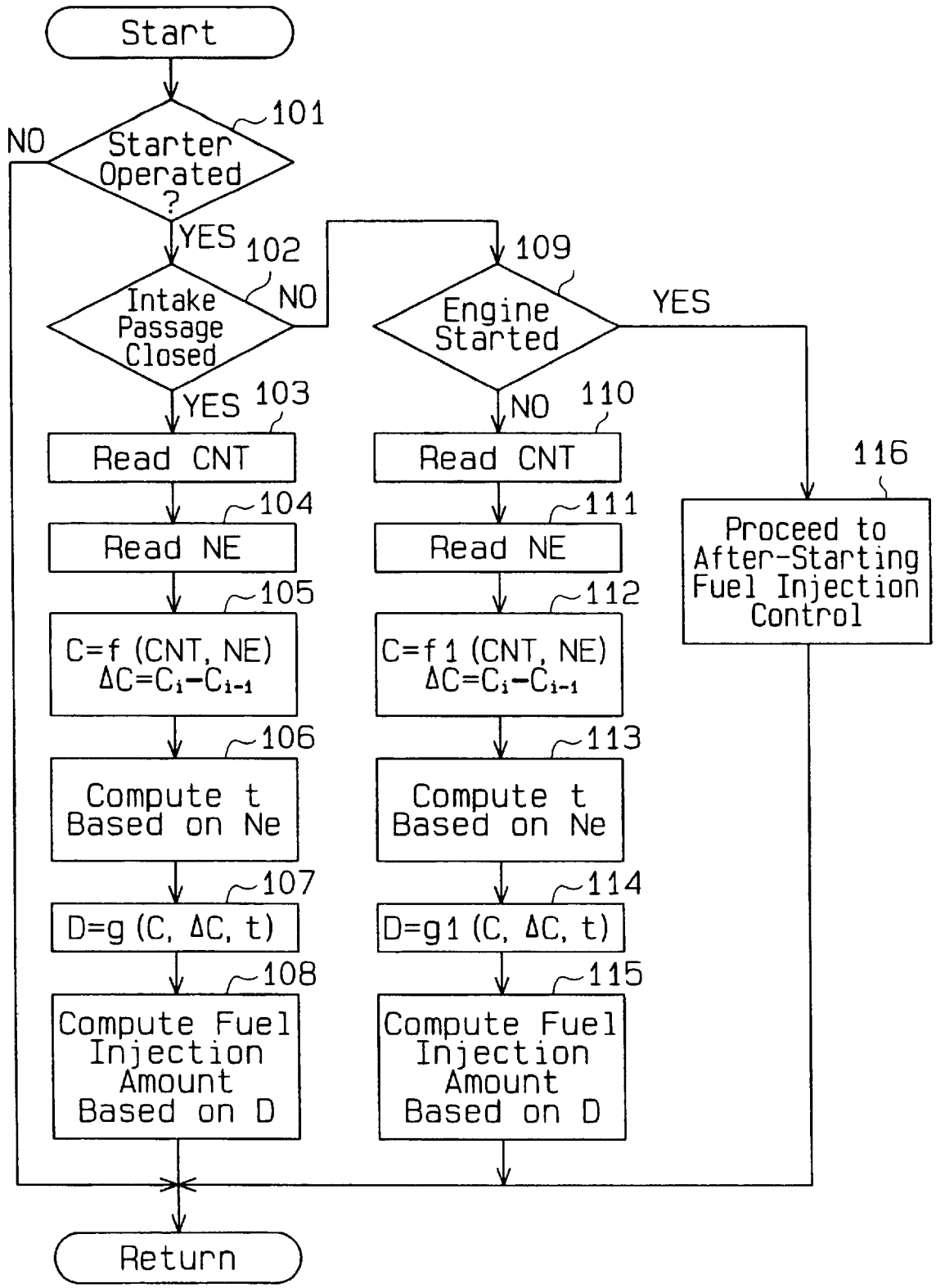
FIG. 8 is a flowchart showing the fuel injection control routine that is executed when starting the engine.

The fuel injection control routine will now be described with reference to FIG. 8.

In step 101, the ECU 50 determines whether the value of the starter signal ST is set at one. If set at one, the ECU 50 determines that the engine 10 is starting and proceeds to step 102. When the value of the starter signal ST is set at zero, the ECU 50 terminates execution of the routine.

In step 102, the ECU 50 determines whether the throttle valve 181 is completely closing the intake passage 15 by referring to the idle signal IDL. If completely closed, the ECU 50 proceeds to step 103. When the throttle valve 181 is arranged at an open position, the ECU 50 proceeds to step 109.

In step 103, the ECU 50 reads the count value CNT, which is the value of the time measured by the counter 58. The counter value CNT indicates the time elapsed since when the engine speed NE increased to a predetermined value after distinguishing the present stroke performed in the cylinders 11a. At step 104, the ECU 50 reads the engine speed NE.

Figures 7A, 7B:
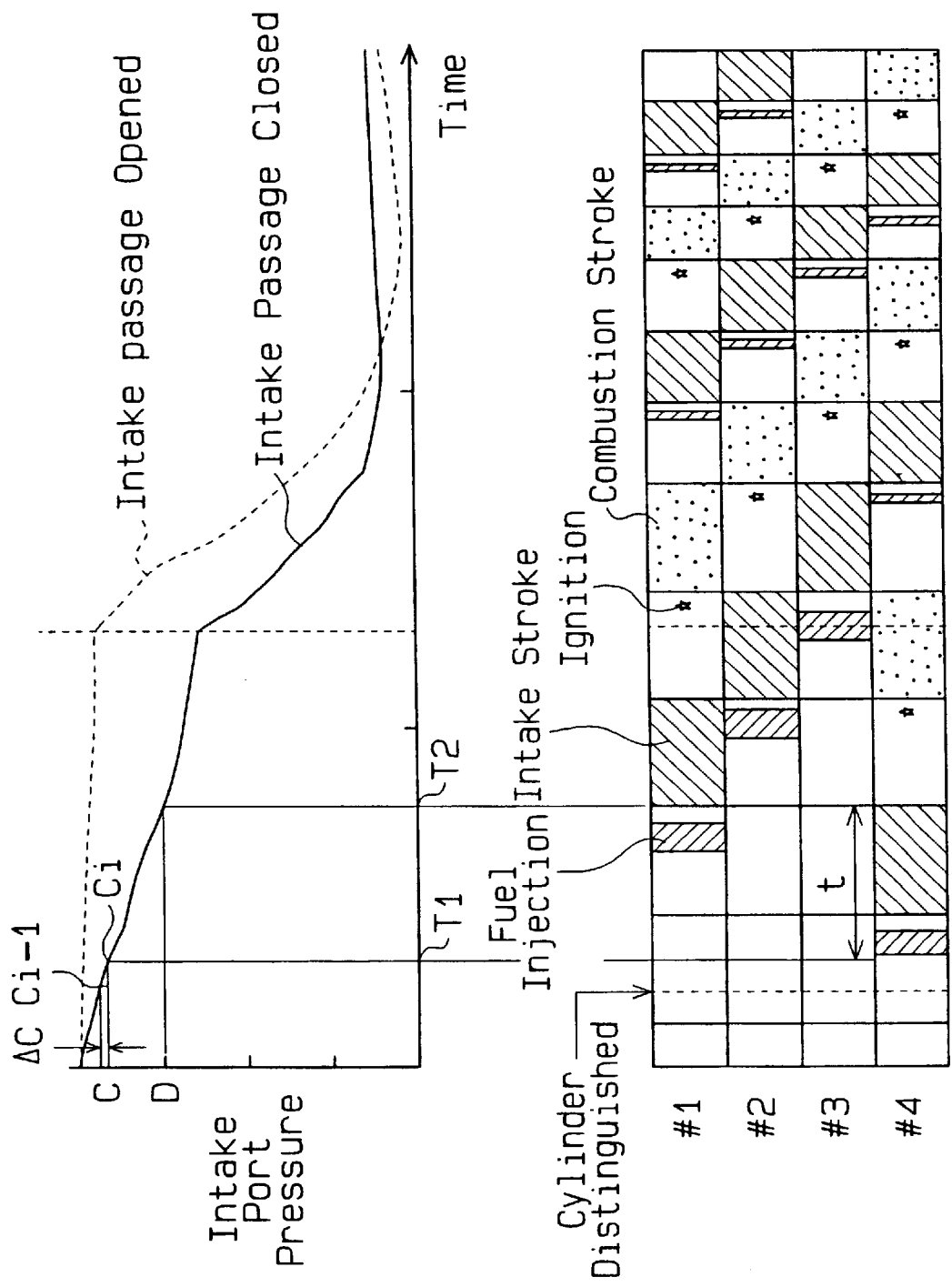
FIG. 7(a) is an enlarged view of FIG. 3(c)
FIG. 7(b) is an enlarged view of FIG. 3(d)

In step 105, the ECU 50 estimates the value of the present pressure C in the intake passage 15 from the count value CNT and the engine speed NE. More specifically, the ECU 50 estimates the value of the negative pressure in each cylinder 11a in the vicinity of the associated intake port 121. The pressure C will hereafter be referred to as the intake port pressure. The pressure C differs from the pressure detected by the pressure sensor 31. When estimating the intake port pressure C, the ECU 50 refers to predetermined function data, the parameters of which include the count value CNT, the engine speed NE, and the intake port pressure C. The ECU 50 further computes the pressure alteration $\Delta C$. As shown in FIG. 7($a$), the pressure alteration $\Delta C$ is obtained by subtracting the present intake port pressure $C_i$ from the intake port pressure of the previous routine $C_{i-1}$, as shown in FIG. 7($a$).

In step 106, the ECU 50 computes the valve opening time period t of the intake valve 13 that is to undergo subsequent fuel injection based on the engine speed NE. The opening time period t of the intake valve 13 is the period of time starting from when the intake port pressure C is computed, or time T1, to when the intake valve 13 is closed, time T2.

In step 107, the ECU 50 estimates the intake pressure D that corresponds to the subject cylinder 11a at time T2, which is when the associated intake valve 13 is closed. When estimating the intake port pressure D, the ECU 50 refers to predetermined function data, the parameters of which include the intake port pressure C, the pressure alteration $\Delta C$, the opening time period t, and the intake port pressure D.

In step 108, the ECU 50 computes the final injection amount TAU. The ECU 50 first computes the engine starting basic injection amount TAUa based on the intake port pressure D and the coolant temperature THW. The ECU 50 then computes the final fuel injection amount TAU for when the throttle valve 181 is closed from the equation below.

$$TAU = TAUa \times KTHW \times KTHA$$

Figure 5:
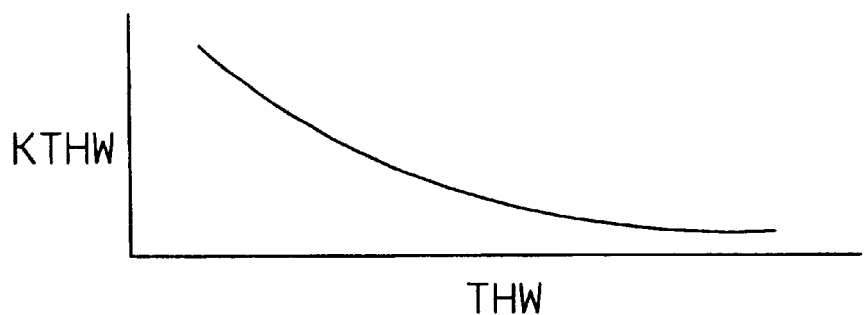
FIG. 5 is a graph illustrating the relationship between the coolant temperature and the coolant temperature correction coefficient.
Figure 6:
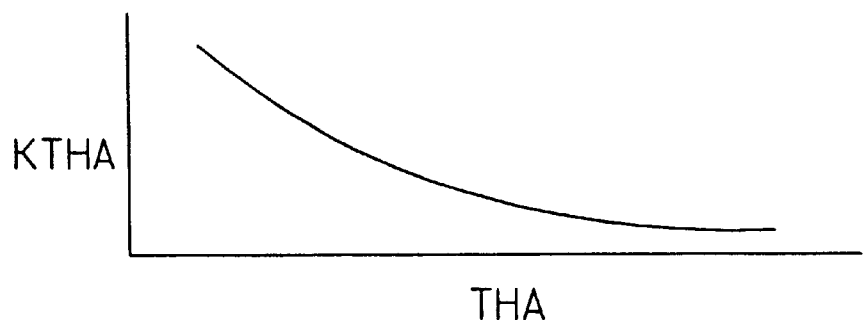
FIG. 6 is a graph illustrating the relationship between the intake air temperature and the intake air temperature correction coefficient.

KTHW is a coolant temperature compensation coefficient, and KTHA is an intake air temperature compensation coefficient. The coolant temperature compensation coefficient KTHW is determined in accordance with the coolant temperature THW, as shown in the graph of FIG. 5. In the same manner, the intake air temperature compensation coefficient KTHA is determined in accordance with the intake pressure temperature THA, as shown in the graph of FIG. 6.

After the computation of the final injection amount TAU, the ECU 50 terminates the execution of the routine.

When proceeding to step 109 from step 102, the ECU 50 determines whether the starting of the engine has been completed by referring to a starting flag. The starting flag is set at one in another routine if the engine speed NE reaches a predetermined value, which is lower than the engine idle speed. Under other conditions, the starting flag is set at zero. Accordingly, the ECU 50 proceeds to step 116 if the starting flag is set at one and to step 110 if the starting flag is set at zero.

In step 116, the ECU 50 enters fuel injection control that is to be executed when the engine has been started and then terminates the execution of the routine.

When, in step 109, the engine 10 has not yet been started with the intake passage 15 opened by the throttle valve 181, the ECU 50 proceeds to step 110.

The processes carried out in steps 110 to 115 are mostly identical to that carried out in the above-mentioned steps 103–108. However, in step 112, the ECU 50 refers to function data differing from that of step 105 when estimating the intake port pressure C. Also, in step 114, the ECU 50 refers to function data differing from that of step 107 when estimating the intake port pressure D.

In steps 110 to 115, the intake passage 15 is opened by the throttle valve 181. Thus, the amount of air drawn into the combustion chambers 62 is greater than that during the processing of steps 103 to 108. Accordingly, the amount of fuel injected from the injector 26 in step 115 is increased in accordance with the increase in the air amount.

In this routine, the ECU 50 estimates the present intake port pressure C and the intake port pressure D, which is what the pressure would be if the intake valve 13 were closed. Accordingly, the amount of fuel corresponding to the intake port pressure D is computed and injected into each cylinder 11a from the associated injector 16.

Figure 9:
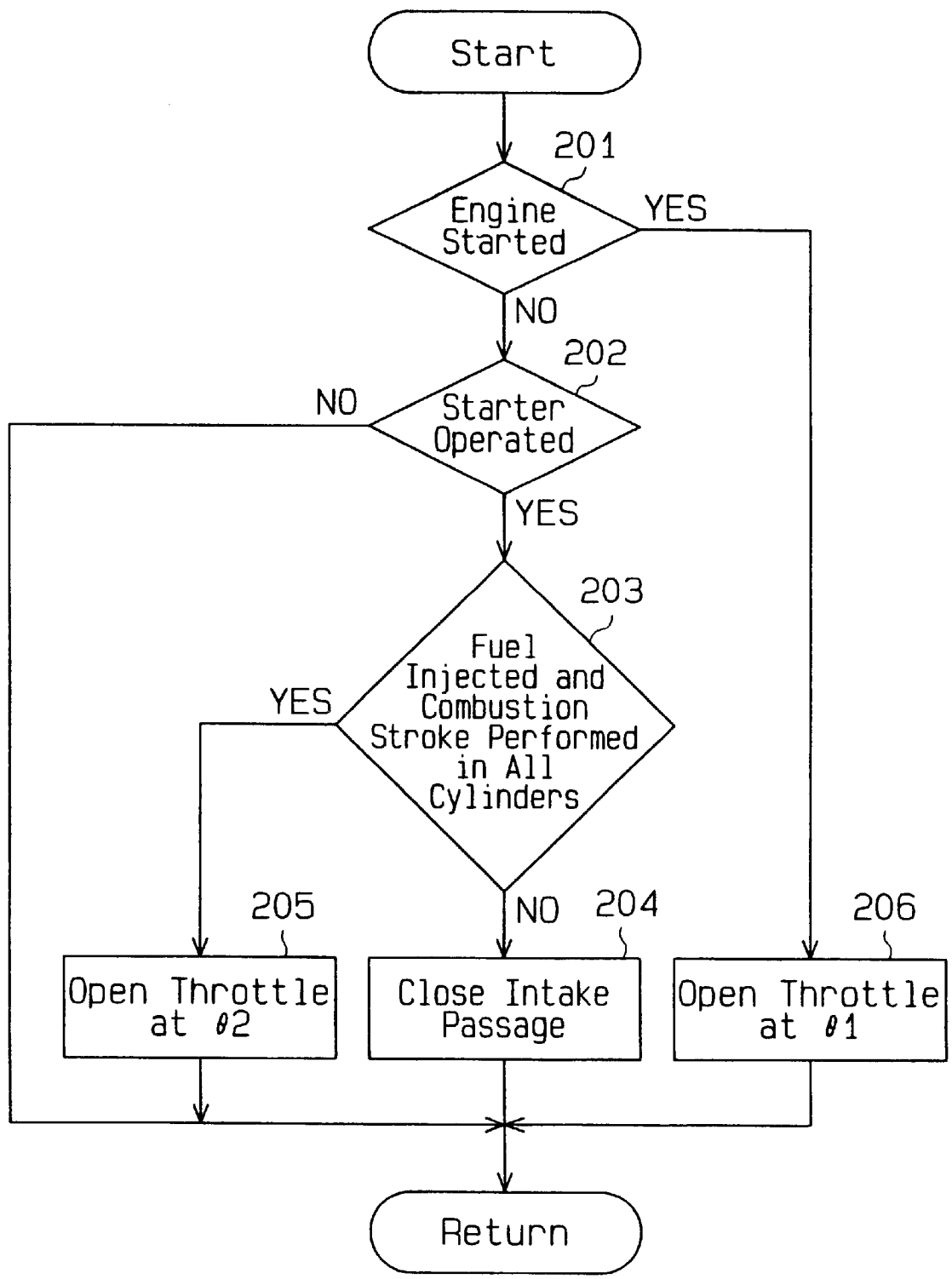
FIG. 9 is a flowchart showing the throttle valve control routine that is executed when starting the engine.

The throttle valve control routine executed when starting the engine will now be described with reference to FIG. 9.

In step 201, the ECU 50 determines whether the starting of the engine 10 has been completed by referring to the starting flag in the same manner as in step 109 described above. If the engine 10 has been started, the ECU 50 proceeds to step 206. If the starting of the engine 10 has not yet been completed, the ECU 50 proceeds to step 202.

Since the engine 10 has been started in step 206, the ECU 50 opens the intake passage 15 to idle the engine 10 by adjusting the throttle valve 181 to the after-starting opening angle θ1. The ECU 50 then terminates the routine. The opening angle θ1, which idles the engine 10, corresponds to the angle that permits the amount of air necessary to keep the engine 10 running to flow.

In step 202, the ECU 50 determines whether the starter 63 is operating based on the starter signal ST. If the starter 63 is operating, the ECU 50 proceeds to step 203. If the starter 63 is not operating, the ECU 50 terminates the routine.

In step 203, the ECU 50 determines whether fuel has been injected into each and every one of the four cylinders 11a (#1–#4) and whether the associated four pistons 61 have all finished performing the combustion stroke. Step 203 is carried out based on the signals from the engine speed sensor 35 and the cylinder distinguishing sensor 36. If the conditions of step 203 have been satisfied, the ECU 50 proceeds to step 205. If the conditions of step 203 have not been satisfied, the ECU 50 proceeds to step 204. For example, as shown in FIG. 7(*a*) and 7(*b*), if fuel is initially injected into the fourth cylinder #4, fuel is injected subsequently in the order of the first cylinder #1, the second cylinder #2, and the third cylinder #3. Afterward, the piston 61 associated with the fourth cylinder #4 enters the combustion stroke. The pistons 61 of the first, second, and third cylinders #1, #2, #3 then enter the expansion stroke proceeding one after another. As the piston 61 associated with the third cylinder #3 enters the combustion stroke, the ECU 50 proceeds to step 205 from step 203. In other words, if the starting of the engine 10 has not yet been completed even when a predetermined time period has elapsed since initiating fuel injection, the ECU 50 proceeds to step 205 from step 203.

It step 204, the ECU 50 closes the intake passage 15 with the throttle valve 181 and then terminates the routine.

In step 205, the ECU 50 further opens the intake passage 51 to increase the amount of air drawn into the combustion chambers 52 by adjusting the throttle valve 181 to the predetermined opening angle θ2. The ECU 50 proceeds to step 205 when the amount of air drawn into the combustion chambers 62 becomes insufficient as a predetermined time period elapses after cranking. The insufficient amount of air hinders the starting of the engine 10. The opening angle θ2 is sufficient to increase the amount of air drawn into the combustion chambers 62 while also increasing the actual intake port pressure.

The operation of the fuel injection control apparatus will now be described with reference to the time charts of FIGS. 3(*a*) to 3(*d*), FIG. 7(*a*) and 7(*b*). The time charts show the engine speed NE, the throttle angle TA, the intake port pressure, and the current stroke of the cylinders #1 to #4.

When combustion takes place initially in the combustion chamber 62 of the fourth cylinder #4, as shown in FIG. 3(*d*), the engine speed NE starts increasing as shown in FIG. 3(*a*). The completion of the starting of the engine 10 is determined when the engine speed NE reaches a predetermined value at time T3. As shown in FIG. 3(*b*), the intake passage 15 is closed until time T3 by the throttle valve 181 to decrease the intake port pressure. After time T3, the throttle valve 181 is adjusted and maintained at the opening angle θ1. This allows air to flow through the intake passage 15 into the combustion chambers 62 and to idle the engine 10.

The solid line of FIG. 3(*c*) shows the fluctuation of the intake port pressure with the intake passage 15 in a continuously closed state. The dotted line of FIG. 3(*c*) shows the fluctuation of the intake port pressure after cranking with the intake passage 15 in a continuously opened state (the state in which the throttle angle TA is held at the predetermined opening angle θ2). If the intake passage 15 is continuously closed, the intake port pressure decreases suddenly as the cranking is started. However, if the intake passage 15 is continuously opened, the amount of air drawn into the combustion chambers 62 is relatively large. Thus, the intake port pressure decreases gradually as cranking is started.

The pressure in the vicinity of the intake port 121 (intake port pressure), to which fuel is injected by the associated injector 16, differs from the pressure in the surge tank 17 (intake air pressure), which is detected by the pressure sensor 31. The intake port pressure fluctuates as time elapses. The intake port pressure is estimated from the counter value CNT (the elapsed time since initiation of cranking) and the engine speed NE. There is a slight time lag from when fuel is injected from the injectors 16 to when the injected fuel reaches the associated combustion chamber 62. A decrease in the intake port pressure takes place as the injected fuel reaches the associated combustion chamber 62. Accordingly, the fluctuation of the intake port pressure is estimated ahead of time to supply the fuel amount that will correspond to the actual intake port pressure. More specifically, an estimation made of the intake port pressure of the intake valve 13, corresponding to the cylinder 11 into which fuel is injected, when the intake valve 13 is closed (after time period t). The optimum amount of injected fuel is computed in accordance with the estimated intake port pressure. Injection of fuel in accordance with the port pressure enhances the starting ability of the engine 10 and reduces undesirable emissions such as hydrocarbons.

When the starting of the engine 10 is not completed after a predetermined time period elapses, there is a tendency for misfires to occur due to the insufficient amount of air in the combustion chambers 62. This hinders smooth starting of the engine 10. In this embodiment, if the starting of the engine 10 has not been completed, the intake passage 15 is opened by adjusting the throttle valve 181 to the predetermined angle θ2 even when fuel has been injected to each cylinder 11a and the associated piston 61 has performed the combustion stroke. This increases the amount of air drawn into the combustion chambers 62. When computing the amount of fuel injection, an increase in the air amount increases the basic fuel injection amount. The increase in the amount of air and the amount of fuel improves the starting ability of the engine 10. This positively starts the engine 10.

Although only one embodiment of the present invention has been described herein, it should be apparent to those skilled in the art that the present invention may be embodied in many other specific forms without departing from the spirit or scope of the invention. More particularly, it should be understood that the invention may be embodied in the following forms.

(1) The intake air pressure sensor 31 may be eliminated. In this case, an air flow meter is arranged in the intake passage 15 to measure the intake air amount.

(2) Instead of referring to the counter value CNT and the engine speed NE to estimate the intake port pressure, the intake air pressure PM, which is detected by the intake air pressure sensor 31, may be referred in estimating the port pressure. In this case, it is necessary to correct the intake air pressure PM so that it coincides with the actual intake port pressure. The intake port pressure D, after time period t elapses, is estimated from the corrected pressure value.

(3) In the preferred and illustrated embodiment, the throttle valve 181 opens the intake passage 15 to increase the amount of air drawn into the combustion chambers 62 when fuel has been injected into every cylinder 11a and the corresponding pistons 11a have all undergone the expansion stroke. However, the amount of air drawn into the combustion chambers 62 may be increased in other ways. For example, the intake passage 15 may be opened when three of the cylinders 11a among the four have performed the expansion stroke. The intake passage 15 may also be opened after a predetermined time elapses after fuel is initially injected from the injector 16.

Figure 10:
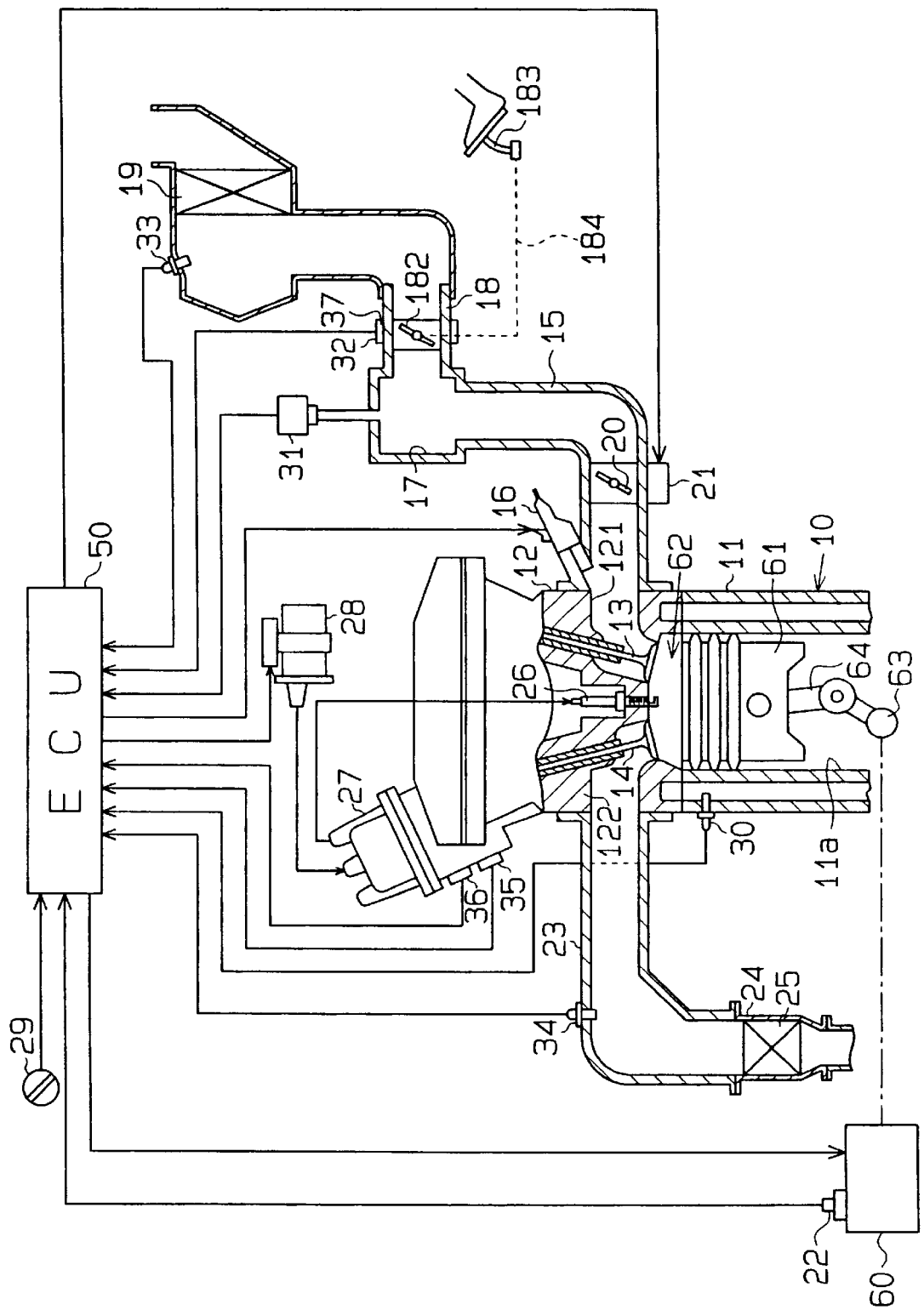
FIG. 10 is a diagrammatic view showing a second embodiment of a fuel injection control apparatus according to the present invention.

(4) As shown in FIG. 10, a throttle valve 182 linked to an acceleration pedal 183 by a throttle cable 184 may be employed in lieu of the electronically controlled throttle valve 181. The throttle valve 182 does not completely close the intake passage 15 but allows the passage of an amount of air that is sufficient to idle the engine 10. In this case, an electronically controlled valve 20 is arranged in the intake passage 15 to adjust the amount of air flowing through the passage 15. The opening angle of the valve 20 is adjusted by the actuator 21. During starting of the engine 10, the valve 20 completely closes the intake passage 15.

Therefore, the present examples and embodiments are to be considered as illustrative and not restrictive and the invention is not to be limited to the details given herein, but may be modified within the scope of the appended claims.

What is claimed is:

1. An apparatus for adjusting the amount of air introduced into a cylinder of an internal combustion engine, the apparatus comprising:

a crankshaft;

a starter for cranking the crankshaft;

an intake passage connected to the cylinder for introducing air to the cylinder;

an intake valve for cyclically opening and closing the cylinder;

an injector for injecting fuel to the intake passage;

an intake control valve positioned in the intake passage, the intake control valve serving to selectively close and open the intake passage;

an engine condition detector for detecting a condition of the engine;

a first computer for computing an amount of fuel to be injected based on the detected condition of the engine;

a fuel controller for controlling the injector to inject the computed amount of fuel;

a first controller for controlling the position of the intake control valve to adjust the amount of air flow into the cylinder, wherein said first controller controls the intake control valve to decrease the pressure in the intake passage when the engine is cranked, and wherein said first controller moves the intake control valve to a first position to open the intake passage by a predetermined amount to increase the amount of air introduced into the cylinder when a certain time period elapses from when the engine is cranked if the engine has not started running.

2. The apparatus according to claim 1, wherein the engine has a plurality of cylinders, and wherein the certain time period is determined by when fuel has been injected to all cylinders and when a combustion stroke has been performed by all cylinders.

3. The apparatus according to claim 1, wherein said first controller opens said intake control valve to a second position to allow the engine to idle when the engine has started running.

4. The apparatus according to claim 1, further comprising a corrector for correcting the amount of fuel to be injected from the injector when said intake passage is opened.

5. The apparatus according to claim 1, wherein said intake control valve includes a throttle valve.

6. The apparatus according to claim 5, wherein said throttle valve is separately controlled by an acceleration pedal.

7. The apparatus according to claim 1, wherein said intake passage has an upstream end and a downstream end, wherein said intake control valve is positioned in the upstream end, and wherein said injector is positioned in the downstream end.

8. The apparatus according to claim 4, wherein said engine has a plurality of cylinders, and wherein the intake passage is opened when fuel has been injected to all the cylinders and when a combustion stroke has been performed in all cylinders.

9. The apparatus according to claim 1, further comprising a first estimator for estimating the pressure in the intake passage adjacent to the injector based on the detected condition of the engine, wherein said first computer computes the amount of fuel to be injected from the injector based on the estimated pressure.

10. The apparatus according to claim 1, further comprising a throttle valve for adjusting the amount of air flow into the cylinder, wherein the throttle valve is connected to an acceleration pedal, and wherein the opening position of the throttle valve is operated by the acceleration pedal.

11. An apparatus for adjusting the amount of air introduced into a cylinder of an internal combustion engine, the apparatus comprising:

a crankshaft;

a starter for cranking the crankshaft to start the engine;

an intake passage connected to the cylinder for introducing air to the cylinder;

an intake valve for cyclically opening and closing the cylinder;

an injector for injecting fuel to the intake passage;

an intake control valve positioned in the intake passage, the intake control valve serving to selectively close and open the intake passage;

an engine condition detector for detecting a condition of the engine;

a first computer for computing an amount of fuel to be injected based on the detected condition of the engine;

a fuel controller for controlling the injector to inject the computed amount of fuel;

a first controller for controlling the position of the intake control valve to adjust the amount of air flow into the cylinder, wherein said first controller controls the intake control valve to decrease the pressure in the intake passage when the engine is cranked, and wherein said first controller moves the intake control valve to a first position to open the intake passage by a first predetermined amount to increase the amount of air introduced into the cylinder when a certain time period elapses from when the engine is cranked if the engine has not started running, and wherein the first controller moves the intake control valve to a second position to open the intake passage by a second predetermined amount when the engine has started running.

12. The apparatus according to claim 11, wherein the first controller completely closes the intake control valve to decrease the pressure in the intake passage when the engine is cranked.

13. A method for adjusting the amount of air introduced into a cylinder of an internal combustion engine, the engine comprising:

a crankshaft;

a starter for cranking the crankshaft;

an intake passage connected to the cylinder for introducing air to the cylinder;

an intake valve for cyclically opening and closing the cylinder;

an injector for injecting fuel to the intake passage;

an intake control valve positioned in the intake passage, the intake control valve serving to selectively close and open the intake passage;

an engine condition detector for detecting a condition of the engine;

the method comprising the steps of:

computing an amount of fuel to be injected based on the detected condition of the engine;

controlling the injector to inject the computed amount of fuel;

controlling the position of the intake control valve to adjust the amount of air flow into the cylinder, wherein the intake control valve is controlled to decrease the pressure in the intake passage when the engine is cranked, and wherein the intake control valve is moved to a first position to open the intake passage by a predetermined amount to increase the amount of air introduced into the cylinder when a certain time period elapses from when the engine is cranked if the engine has not started running.

14. The method according to claim 13, further comprising a step of opening said intake control valve to a second position to allow the engine to idle when the engine has started running.

15. The method according to claim 13, further comprising a step of correcting the amount of fuel to be injected from the injector when said intake passage is opened.

16. The method according to claim 13, wherein said engine has a plurality of cylinders, and wherein the certian time period is determined by when fuel has been injected to all the cylinders and when a combustion stroke has been performed in all cylinders.

17. The apparatus according to claim 13, further comprising a step of estimating the pressure in the intake passage adjacent to the injector based on the detected condition of the engine, wherein said computing of the amount of fuel to be injected from the injector is based on the estimated pressure.

\* \* \* \* \*